(12) United States Patent
Smerdon, Jr.

(10) Patent No.: US 6,446,994 B1
(45) Date of Patent: Sep. 10, 2002

(54) BICYCLE FENDER SYSTEM

(76) Inventor: Ernest Thomas Smerdon, Jr., 4016 Glenda Pl., Columbus, OH (US) 43220

( * ) Notice: Subject to any disclaimer, the term of this patent is extended or adjusted under 35 U.S.C. 154(b) by 0 days.

(21) Appl. No.: 09/734,264

(22) Filed: Dec. 12, 2000

Related U.S. Application Data

(60) Provisional application No. 60/173,121, filed on Dec. 27, 1999.

(51) Int. Cl.[7] ............................................... B62D 25/18
(52) U.S. Cl. ................................ 280/152.1; 280/152.3; 280/153.5; 280/852
(58) Field of Search ........................... 280/152.1, 152.3, 280/153.5, 154.5, 852

(56) References Cited

U.S. PATENT DOCUMENTS

| | | | |
|---|---|---|---|
| 4,243,241 A | | 1/1981 | Davis |
| 4,268,055 A | * | 5/1981 | Bell ............................ 280/278 |
| 4,319,763 A | | 3/1982 | White |
| 5,120,073 A | | 6/1992 | Sealy, Jr. |
| 5,121,935 A | | 6/1992 | Mathieu et al. |
| 5,322,311 A | | 6/1994 | Dunn |
| 5,562,296 A | | 10/1996 | Hall et al. |
| 5,868,411 A | | 2/1999 | Dymeck |
| 5,899,473 A | * | 5/1999 | Mackenzie ............... 280/152.3 |
| 5,904,361 A | | 5/1999 | Powell |
| 5,918,904 A | | 7/1999 | Hanesworth |

FOREIGN PATENT DOCUMENTS

| | | | | |
|---|---|---|---|---|
| DE | 4232687 A1 | * | 3/1994 | ............ B26J/15/04 |
| FR | 2633890 A1 | * | 1/1990 | ............ B62J/15/02 |
| GB | 2229978 A | * | 10/1990 | ............ B62J/15/02 |

* cited by examiner

*Primary Examiner*—Kenneth R. Rice
*Assistant Examiner*—Christopher Buchanan

(57) ABSTRACT

A lightweight, easily removable, full length bicycle fender system designed to accommodate the tight clearances between the front and rear tires and the fork, frame, and brakes tire of modern racing-style bicycles. The front and rear fenders mount to the bicycles by means of hook and loop fastening straps and single support stays that are secured between the wheel quick release and the fork and frame dropouts. One embodiment is a sectional fender that can be disassembled and carried in a bag that attached to the bicycle frame or below the saddle. An optional tensioning means provides additional stability for the fenders and helps to ensure a tight connection of the sections of the sectional fender embodiment. The fender system includes optional front and rear mudflaps that provide front wheel spray protection for the cyclist and rear wheel spray protection for following riders.

9 Claims, 4 Drawing Sheets

BICYCLE FENDER SYSTEM

PRIOR APPLICATION

This application is a continuation in part of U.S. application Ser. No. 60/173,121, filed Dec. 27, 1999.

FIELD OF INVENTION

The present invention is in the field of bicycles and bicycling. The present invention relates generally to fenders and mudguards for bicycles, and more specifically to removable front and rear fenders for road racing-style bicycles.

BACKGROUND OF THE INVENTION

Traditional full length fenders for road bicycles are typically made from a rigid plastic material or aluminum and have two sets of two steel support stays that connect to each side of the fender. The stays are usually attached to threaded eyelets located on the fork and frame dropouts. In addition, the fenders are mounted to the brake attachment bolts at the fork crown and the rear brake attachment bridge. This method of mounting traditional bike fenders requires ample clearance between the tires and the bicycle frame, fork crown and brakes and fork crown.

Modern road-racing style bicycles, on the other hand, have narrow, high pressure tires and relatively tight clearances between the tires and the bicycle frame and fork. In addition, such bikes are typically equipped with brakes that provide only minimal tire clearance both under and between the brake calipers. The tight frame clearances of modern road-racing bicycles (unlike fender-friendly touring and commuting bikes) makes the installation of traditional fenders either impossible or impractical, which is reflected by the prevalent use of front and rear dropouts that lack the traditional eyelets for attaching fender support stays.

In addition to the great difficulty of installing fenders on many modern road bicycles, the weight and appearance of traditional road fenders are objectionable to many riders. Because traditional fenders are typically a semi-permanent installation (due to the inconvenience of removing and reinstalling them), and most cycling is done in dry weather, many riders will not consider fenders even if their bikes could accept fenders. The downside, of course, is that when fenderless riders are caught in the rain, they have to endure the spray of water and road grit from both front and rear wheels until the roads are dry or they reach their destination. This is especially annoying for cyclists that are riding in a group paceline, because they must also deal with the spray from the rear wheel of the bike they are following. Fenderless riding in the rain also results in a much grittier bike at the end of the ride, and the need to spend more time on cleaning and maintenance.

Despite the obvious advantages of fenders for wet weather riding, the challenge of designing a full front and rear fender system for bikes with tight frame clearances and an absence of dropout eyelets has never been satisfactorily met by the prior art. The attempts to deal with the incompatibility of traditional fenders and modern road bikes have usually involved a reliance on a partial fender or a small spray shield, but these all have the significant shortcoming of covering only a small section of the circumference of the wheel, thus offering only limited spray protection to the cyclist and no protection to a following rider.

For example, U.S. Pat. No. 5,121,935 to Mathieu, et al. (1992) shows a retractable front and rear fender that can be uncoiled (much like a retractable metal tape measure) to extend over the top of the rear wheel and over the section of the front wheel immediately behind the bicycle fork. Similarly, U.S. Pat. No. 5,562,296 to Hall, et al. (1996) discloses a resilient plastic fender that can be uncoiled from a rolled-up storage configuration into a straight length and cantilevered over the rear wheel to provide some spray protection.

U.S. Pat. No. 4,319,763 to White (1982) shows a collapsible fender comprised of two telescoping sections preferably about eight inches long that are extended and secured together by twist ties. The fenders are then inserted between, and twist tied to, the bicycle seat stays and front forks. Because the fenders are a straight length, the front fender must be quite short in order to pass under the bicycle's down tube when the front wheel is turned. The twist tie method of attachment is also of questionable value in maintaining rear fender-tire separation when the fender is inserted, as suggested, between the rear brake calipers of a modern road bike.

U.S. Pat. No. 4,243,241 to Davis (1981) discloses a spray shield intended to prevent spray from the rear wheel from being thrown against the rider's back. It consists of an arm pivotally secured to a clamp mounted to the bicycle seat stay and a spray guard attached to the end of the arm that extends over the rear wheel. The arm may be pivoted upward toward the bicycle saddle when the shield is not needed. Similarly, U.S. Pat. No. 5,120,073 to Sealy, Jr. (1992) shows a fender system comprised of front and rear wheel-mounted spray guards and an optional seat-mounted guard positioned to block tangential spray that would otherwise hit the rider. The wheel-mounted guards are preferably attached to the bike by means of a two-piece system consisting of a single L-shaped support arm that connects, preferably, to a flatbar connector bracket with a U-shaped slot on one end that fits over the wheel axle. The other end of the flatbar bracket is adapted to receive the support arm in an adjustable and removable connection. This arrangement permits the support arm to be adjusted radially in relation to the wheel to accommodate variations in wheel/tire diameter, while also allowing the support arm to be disconnected without the need to remove the flatbar bracket. The support arm and flatbar bracket are preferably made from a structural grade of aluminum, with the support arm having a diameter of ¼".

One significant shortcoming of the Davis '241 and Sealy '073 spray shields is that they leave important areas of the bicycle unprotected from road grit, such as the front and rear brakes, the front derailleur, and the bottom bracket. In addition, the minimalist shape of the rear shield would provide incomplete protection for the rider and no protection to following riders. The two-piece support arm and flatbar bracket combination of Sealy '073 would be susceptible to loosening at the connection of the support arm and bracket from road vibration. Furthermore, the U-shaped slot of the flatbar bracket would not work with the rear dropouts of several higher-end road bikes, in which the quick release contact surface is recessed within an overhang that surrounds a roughly vertical dropout slot.

U.S. Pat. No. 5,904,361 to Powell (1999) discloses a removable fender system comprised of a flat mudguard that clips onto the bicycle down tube and a rear mudguard with support rods that detachably engage the seat stay fame members. It appears that the illustrated rear fender would be susceptible to sliding downward to contact to rear tire (especially because seat stays tend to taper down as they approach the dropout), unless the optional mechanical fastener was used to secure the support rods, in which case the removable feature of the fender would be compromised. The clip-on down tube shield is also found in other prior art, such as U.S. Pat. No. 5,918,904 to Hanesworth (1999), as well as in a number of commercially available mudguards. A common rear fender design, often seen on mountain bikes, is one in which the fender attaches to the seat post or beneath the saddle and cantilevers over the rear wheel. This design protects the rider's back from having mud or water slung onto it from the rear wheel, but offers little protection to the bicycle. Examples of a cantilevered rear fender are found in U.S. Pat. No. 5,322,311 to Dunn (1994), U.S. Pat. No. 5,868,411 to Dymeck (1999), and the Hanesworth '904 patent.

SUMMARY OF THE INVENTION

The present invention addresses the need for a sturdy yet lightweight fender system that will accommodate the tight clearances between the tires and the frame tubes and brakes of modern road racing-style bicycles. Unlike the partial fenders and spray guards of the described prior art, the present invention provides full length fender protection for both the rider and the bicycle. Another object is to provide a removable front mudflap that will protect the bottom bracket area of the bicycle and a rear mudflap that will protect following riders against spray from the rear wheel. This is particularly desirable for cyclists that enjoy riding in a group paceline and who otherwise would have to endure spray directed toward their face from the bicycle ahead.

It is also an object of the present invention to provide a secure method of attachment that will work with a wide variety of bicycle dropout designs. It is a further object to provide a fender attachment method that requires no tools and that enables the fenders to be installed and removed quickly and easily by the rider. Yet another object is to provide these desirable features in a sectional fender system that can be disassembled and conveniently carried in a bag attached behind the saddle or to the bicycle frame.

These and other objects and advantages will become apparent from a consideration of the drawings and the description of the invention.

DETAILED DESCRIPTION OF THE INVENTION

Figure 1:
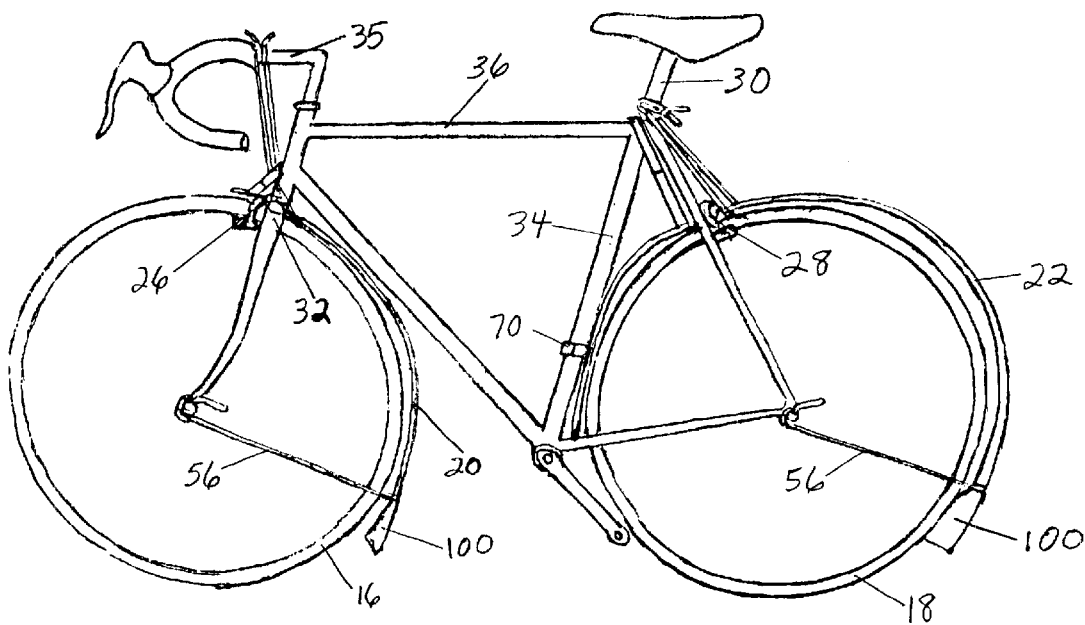
FIG. 1 is a side view of a road bicycle with the fender system of the preferred embodiment mounted thereto.

The present invention discloses a full length fender for modern road bicycles. FIG. 1 shows a typical road bicycle with front and rear fenders installed. The front fender 20 extends from a point just in front of the front brake 26 to a point behind the front tire 16 and below the equator of the front wheel. The rear fender 22 extends from a point behind the lower section of the bicycle seat tube 34 to a point behind and level with or below the equator of the rear wheel, passing under the rear brake 28. The fenders are attached to the bike by means of fender support stays 56. In the preferred embodiment, a single stay is used to attach each fender. As discussed later, a fastening means is used to secure the front fender to the underside of the front brake and fork crown 32 and to secure the rear fender behind the seat tube and under the rear brake. In addition, a tensioning means, also described later, may be employed to stiffen the front and rear fenders and reduce rear fender "bounce" over rough roads.

The front fender must be capable of passing through relatively narrow and tight clearances between the front tire 16 and the front brake 26 and fork crown 32. Likewise, the rear fender must pass through tight clearances between the rear tire 18 and the brake bridge, rear brake 28, and seat tube 34. Accordingly, in order to prevent the fender from rubbing against the tire, the fenders should have a relatively thin longitudinal middle section and be capable of being securely fastened against, as pertinent, the underside of the front and rear brakes, fork crown, brake bridge and against the seat tube. In addition, the front and rear fenders should be relatively narrow at the locations where they pass under the front brake and fork crown and rear brake and brake bridge, respectively, because the side-to-side clearance in these areas is often quite limited. Moreover, it is also important that the fender be sufficiently rigid to maintain a generally curved shape and not sag against the tire, and yet be sufficiently flexible to accept being tightly secured against the above-described points of contact with the bicycle. As can be appreciated from FIG. 1, proper securement of the rear fender will typically result in the fender being pulled into a shape that departs from the curvature of the wheel rim and tire. This is necessary because the close tire/fender separation at the securement locations is neither practical nor desirable to maintain throughout the length of the fender. Some flexibility of the fender is also needed so that the sides of the fender where it passes under the brake will accommodate the inward movement of the brake calipers during braking.

The fenders are preferably made from a polymeric material that has the desired degree of stiffness as well as light weight, strength, and durability. High density polyethylene resin has been shown to provide an acceptable combination of physical properties as well as the advantages of low cost and extrudability. From the standpoint of manufacturing cost, the preferred fender manufacturing method is a profile extrusion. It is helpful for the fender to have a curved "set" in a radius somewhat larger than that of a standard road tire, which can be accomplished by coiling the extruded fender material around a core of the proper diameter and allowing it to cool in a coiled configuration. After cooling, the fender material can be cut into the desired lengths. Of course, it can be appreciated that other materials and manufacturing methods can also be used for the fenders of the present invention.

The preferred extrusion for the fenders of the present invention is one with a thin middle section and a small, thin-walled tubular opening on each side. Wall and midsection thicknesses in the 0.030" to 0.050" range will generally be adequate, although other thicknesses may be preferred, depending on the material used. Preferably, the profile has a slight curvature from side-to side, so that the middle rises somewhat above the tubular sides. The fender width can, of course, vary, depending on the fender's intended use. However, an overall fender width of approximately 1.125" to 1.250" will generally accommodate the front brake/fork and rear brake/brake bridge combinations typically found on road racing bikes and still adequately cover the narrow high pressure tires common to these bikes. A wider fender may also be used to provide even better spray protection, but it may be necessary to cut away a portion of the sides of the fender where it passes between the fork and front brake and the brake bridge and rear brake.

The tubular openings of the preferred fender extrusion profile, in addition to adding rigidity to the fender structure, also facilitate the manufacture of a sectional fender system. When combined with the fastening means and support stay features, described later, of the present invention, the sectional fender system allows a cyclist to carry the complete fender system in a bag and to easily install it without tools in the event of rain. The preferred embodiment of the sectional fender uses a total of six fender sections, two for the front fender and four for the rear fender. A fender section length of approximately 12 to 13 inches has been shown to work well in providing a traditional full length fender coverage, but other lengths may be preferred for certain fender applications.

Figure 2:
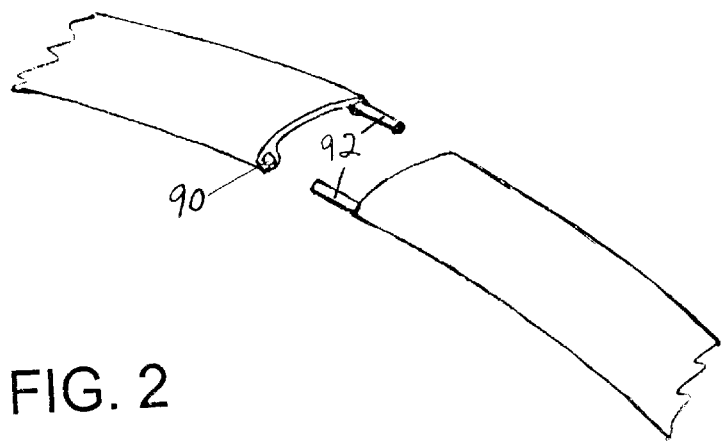
FIG. 2 is partial perspective view of two disconnected sections of the sectional fender of the preferred embodiment.

The sections may be connected by any of a number of methods, but the preferred means are connector stays that are partially inserted and bonded into one or both of the tubular openings at selected ends of the preferred fender sections. As shown in FIG. 2, the fender sections are connected by inserting each connector stay 92 into a tubular opening 90 in the end of an abutting fender section. The diameter of the protruding connector stays should be the same as, or just slightly larger than, the inside diameter of the tubular openings, so that the stays will frictionally engage the openings and resist slippage. The protruding stay ends should be chamfered to facilitate insertion. The stays may be made of metal, such as stainless steel wire, or a relatively rigid plastic. Depending on the length of the stays, they may be straight or curved in a radius approximating that of the fender.

The preferred sectional fender system, when assembled, has the advantage of non-overlapping fender section joints, which provides a clean appearance, as well as the advantage of using sections cut from the same profile extrusion. However, a sectional fender may also be assembled using sections designed to mate together, which could involve molded sections or sections cut from different profile extrusions. An alternative embodiment discloses fender sections joined together by sliding one section into open channels formed along the sides of another section. The channels of one section frictionally engage the sides of the other section in a close-fitting relationship. A total of three sections each of the channeled and non-channeled sections would be used in the preferred six-section fender system, and stops could be added to ensure the desired amount of insertion of one section into the receiving channels on another section.

Figure 3:
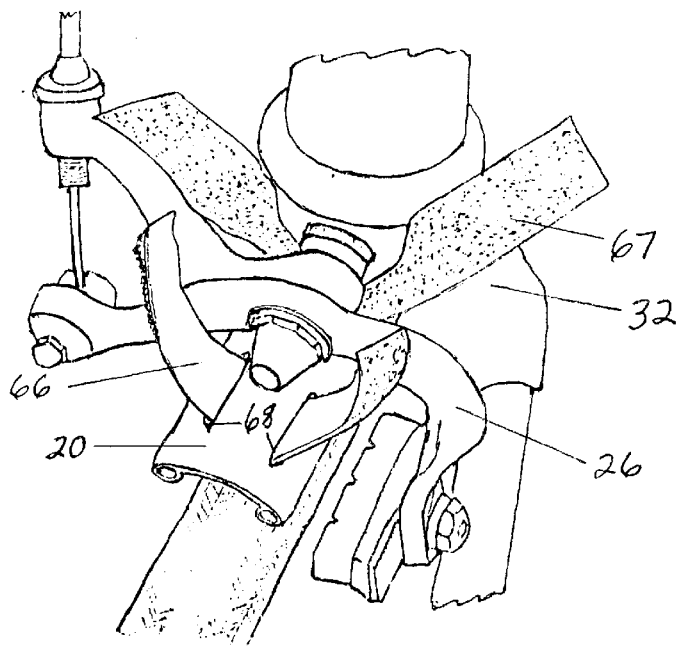
FIG. 3 is a perspective view of the hook and loop fastening means for securing the front fender against the underside of the front brake when a tensioning means is not used.

FIG. 3 shows the preferred fastening means for securing the front fender against the underside of the front brake when a tensioning means is not used. This consists of a loop-sided and a hook-sided fastener strap 66, 67 each of which is passed through a set of two slits 68 formed in the front section of the fender on opposite sides of the fender's longitudinal centerline. The distance between the rear edge of the forward set of slits and the front edge of the rearward set of slits should allow for the thickness of the front brake. The ends of the straps 66, 67, which should have the fastener side facing up on one strap and facing down on the other, can be crossed over the top of the front brake and secured together. Standard width ⅝" or ¾" straps work well and it is helpful to make the rear strap somewhat longer than the front strap and fasten it over the front strap. The extra length of the rear strap makes it is easier to retrieve the ends of the strap from between the fork leg and wheel when the fender is initially positioned under the brake.

There are, of course, a number of other possible strap arrangements for securing the front fender. For example, the fender may also be secured by means of a single hook and loop fastener strap that attaches to the fender at the location of the above-described rearward strap and fastens over the brake attachment bolt in front of the fork crown. Alternatively, instead of fastening a strap over the section of the front brake bolt that extends between the brake and the fork crown, a longer strap may be used and fastened over the handlebar stem. For an even more secure attachment against the underside of the fork crown, another strap may be secured to the fender at a location just behind the fork crown and the ends passed over each shoulder of the fork crown and fastened together over the brake bolt in front of the fork crown. However, the use of a tensioning means with the front fender, described later, will eliminate the need for a behind-the-fork strap and allow for the use of a single hook and loop strap that is secured around the tensioning means over the front brake.

Figure 4:
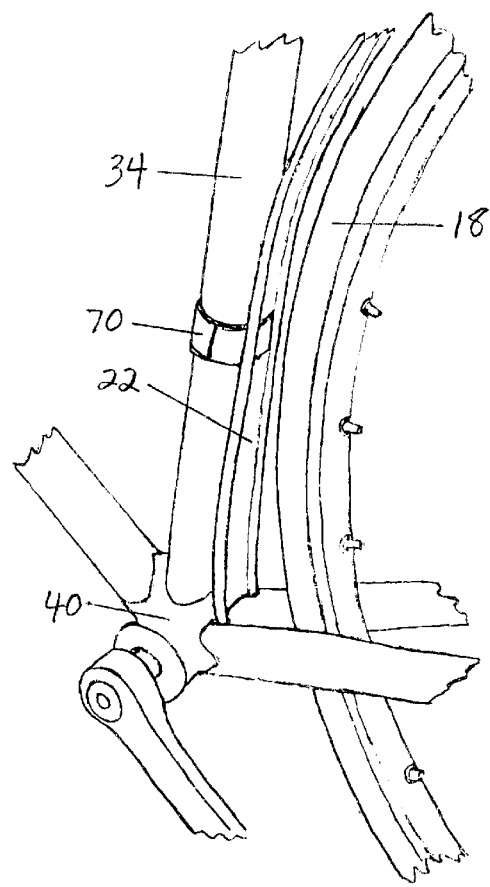
FIG. 4 is a partial perspective view of the rear fender secured to the seat tube.

As shown in FIG. 4, the rear fender 22 is secured behind the seat tube 34 by means of hook and loop fastener straps. The seat tube strap 70 is inserted through the fender preferably at a location on the fender that corresponds to the area of least clearance between the seat tube and rear tire. This allows the fender to be pulled tightly against the seat tube when the strap is fastened and it places the strap material in contact with the seat tube, which avoids any marring of the frame finish that might be caused by the fender rubbing directly against the seat tube. Generally, this strap location will be just above the front derailleur mounting location. However, the ideal distance of the seat tube strap from the forward end of the rear fender will vary somewhat, depending on the dimensions in the area behind the bottom bracket 40. On some bicycles it may be desirable to tuck the forward end of the fender behind the front derailleur cable, which typically runs under the left side of the bottom bracket and crosses behind the seat tube on its way to the front derailleur. Because the end of the fender will contact the chain stays at differing heights in relation to the center of the bottom bracket spindle (which is also the center of the large chainring, which determines front derailleur placement), the seat stay strap location is preferably determined for each bicycle individually. Furthermore, some front derailleurs have a mounting band bolt that extends partially into the space that would normally be occupied by the fender. In such cases, it may be necessary to cut a small notch in the side of the fender to accommodate the mounting band bolt. In addition, if desired, a second strap may be added below the front derailleur mounting band for greater securement of this portion of the rear fender.

Figure 5:
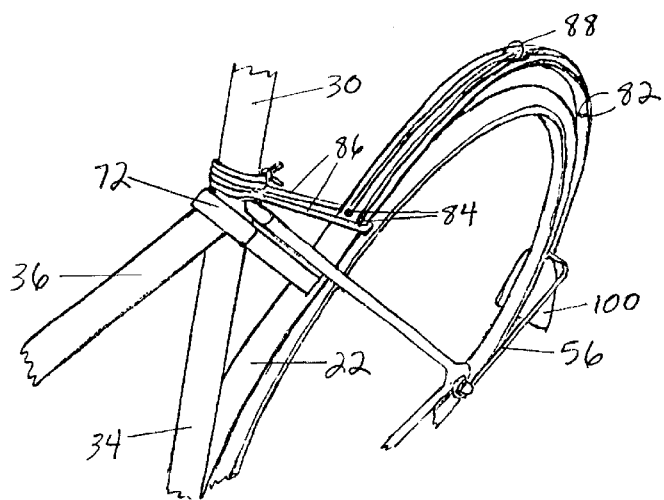
FIG. 5 is a perspective view of the rear fender secured under the rear brake and brake bridge.

The rear fender is also secured against the underside of the rear brake and brake bridge. Again, one or more hook and loop straps are the preferred fastening means. FIG. 5 illustrates the preferred strap location when a single strap 72 is used in conjunction with a tensioning means. The strap preferably attaches to the fender through parallel slits located on each side of the fender's longitudinal center line and just in front of the brake bridge. The strap fastens over the junction of the top tube 36, seat tube 34, and seat post 30.

If a tensioning means is not used, it will also be preferable to use a second and similar strap that attaches to the fender at a location just behind the rear brake and similarly fastens over the top tube/seat tube/seat post junction. Alternatively, the rear fender may also be secured by means of a single strap that similarly attaches to the fender at a location between the brake bridge and rear brake and fastens either over the brake bolt between the rear brake and brake bridge (similar to the alternative front brake fastening method) or fastens over the top tube/seat tube/seat post junction. The location of the rear brake strap(s) should be determined on an individual basis for each bike, because the position of the brake bridge will vary depending on both frame size and the location of the seat stay attachment to the seat tube or seat lug. Therefore, it will generally be desirable to provide an adhesive-backed cutting template with each fender, so that the user can first determine the proper location of the seat tube and rear brake fastener straps and then cut the appropriate slits in the fender. The described fastening straps work well with the preferred embodiment of a sectional fender, because the 12" to 13" fender sections result in the seat tube strap being attached to the first fender section, and the brake and brake bridge fastening straps being attached to the second fender section.

Figure 6:
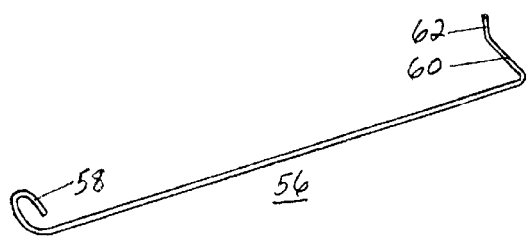
FIG. 6 is a perspective view of a fender support stay.
Figure 7:
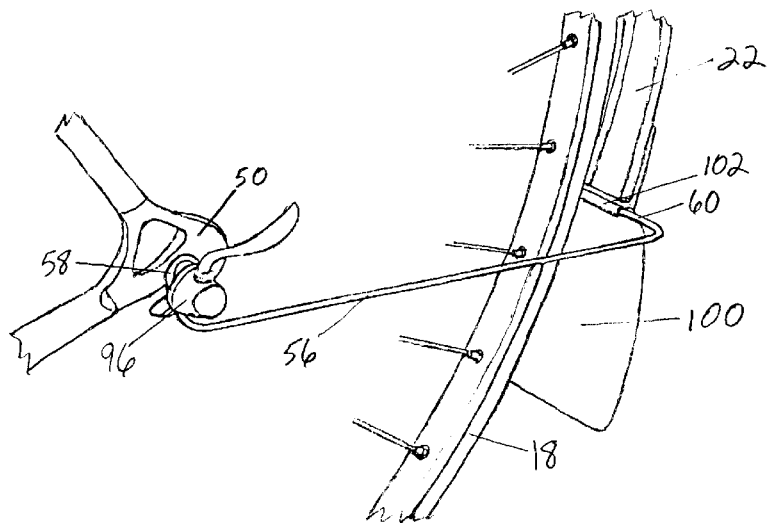
FIG. 7 is a perspective view of a fender support stay secured between a left frame dropout and a rear wheel quick release, with a mudflap inserted onto the support stay and secured to the rear fender.

FIG. 6 shows a fender support stay 56 for road racing-style bicycles that lack threaded dropout eyelets or other threaded openings for attaching traditional fender stays. FIG. 7 shows a rear fender support stay clamped between the outer surface of a frame dropout 50 and the rear wheel quick release 96. The support stays for the preferred fender system are formed from a continuous length of full spring temper stainless steel wire of a diameter sufficient to resist flexing under normal riding conditions. A diameter in the range of 0.120" to 0.140" will generally provide a good balance of rigidity and reasonably light weight for most road riding situations, but other diameters may be preferred for special applications.

As shown in FIG. 6, one end 58 of the support stay is configured so that it can be inserted over a quick release skewer and adequately contact the clamping surfaces of a variety of fork and frame dropouts to promote an even clamping pressure when the quick release is tightened. Ideally, the end of the support stay should be shaped to extend around the clamping surface of fork dropouts and "vertical" frame dropouts (both of which have U-shaped clamping surfaces) and to provide ample contact on the top and bottom clamping surfaces of "horizontal" frame dropouts. Furthermore, the clamped end of the stay should also be shaped so that it fits within the overhang that surrounds a type of vertical frame dropout found on some brands of road-racing bicycles. A shape similar to that shown in FIG. 6 will achieve those objectives. If steel wire with a diameter greater than 0.11" or so is used for the support stay, it will also be desirable to flatten slightly (by grinding, filing, or other methods) the rounded side surfaces of the clamped end of the support stay in order to reduce the space between the dropout and quick release that is taken up by the support stay. This helps ensure that the threaded side of the quick release will not have to be backed too far off the skewer threads to accommodate the support stay, thereby compromising thread contact with the skewer. Additionally, flattening the clamped end increases the clamping surface at the end of the support stay. The described support stay will also work with wheels secured within the dropouts by means of nuts that are threaded onto axles that extend through the dropout (as opposed to quick release axles that typically do not extend beyond the clamping surface of the dropout).

For bicycles with threaded dropout eyelets, a wire support stay with a conventional closed loop at one end may be used. The stay would be secured to the dropout by inserting a threaded fastener through the loop and tightening it to the eyelet. For a sectional fender system, a variety of thumb screw knob and wing head fasteners are available that may be used to enable the rider to install or remove the eyelet-mounted support stays without tools.

The rearward end of the support stay is removably secured to a respective front or rear fender. The support stay of the preferred embodiment, as shown in FIG. 6, should extend from the dropout rearwardly to a point approximately 1" to 1.5" or so beyond the bicycle tire, at which point the stay bends to form a rear horizontal section 60 that extends behind the tire, and then bends upward at a right angle to form a short insertion section 62 that frictionally engages the tubular opening on the right side of the fender. The insertion section could be inserted into the opening on the left side instead, but a right-side insertion is necessary for attaching the preferred mudflap, discussed later. The separation distance between the support stay and the side of the tire is preferably about an inch, which helps to prevent the stay from slapping against the side of the tire on rough roads.

The support stay should combine good rigidity and strength while still allowing the stay to be bent by hand to align the fender directly behind the tire, which are qualities provided by the preferred 0.120" to 0.140" spring temper stainless steel wire. This permits identical stays to be used for the front and rear fenders, because the user can simply tweak the stay in or out to compensate for the difference in the offset of the front and rear tires from the dropout clamping surface (due to the different axle lengths of the front and rear wheels).

The vast majority of modern road racing-style bicycle wheels use rims having the same standard diameter. Because variations in tire height above the rim are fairly small, the distance from the wheel axle to the surface of the tire tread will be similar from bike to bike. Accordingly, the ability to adjust the radial length of the support stay is not necessary. The single, continuous length support stay of the preferred embodiment has the advantages of simplicity, structural integrity, light weight, and low manufacturing cost.

FIG. 7 shows a mudflap 100 attached to the rear horizontal section 60 of the preferred support stay. The function of the front mudflap is to provide additional spray protection for the rider's feet and the bicycle bottom bracket and chain, while the rear mudflap helps protect following riders from a "rooster tail" spray effect. The mudflap is preferably die cut from a thin sheet of lightweight, durable and semi-rigid material, such as high density polyethylene, and is secured to the lower end of both the front and rear fenders. The preferred mudflap is attached in a manner which also secures the support stay's rear horizontal section to the fender, thus preventing the fender from separating from the support stay and minimizing any tendency of the fender to twist around the insertion section of the support stay. Hook and loop fasteners work well for removably securing the mudflap to the end of the fender. For example, a section of hook or loop fastener material can be sewn to the upper inside (forward-facing) portion of the mudflap with a looped section 101 formed at the bottom of the fastener material that will slide onto the horizontal portion 60 of the support stay. The mudflap can be secured to the fender by fastening the hook or loop fastener patch on the mudflap to a complementary patch that has been sewn or adhered to the lower outside (rearward facing) section of the fender.

The fender system of the present invention also includes an optional tensioning means, which gives the fender additional rigidity and helps to counteract any tendency of the fender to bounce against the tire over rough roads. For traditional full length fenders, fender "bounce" is typically eliminated by the use four steel support stays per fender and a bolt-on connection at the brake bridge and fork crown. However, this type of heavy, semi-permanent attachment method is neither practical nor desirable in a fender system for road racing bicycles.

Figure 8:
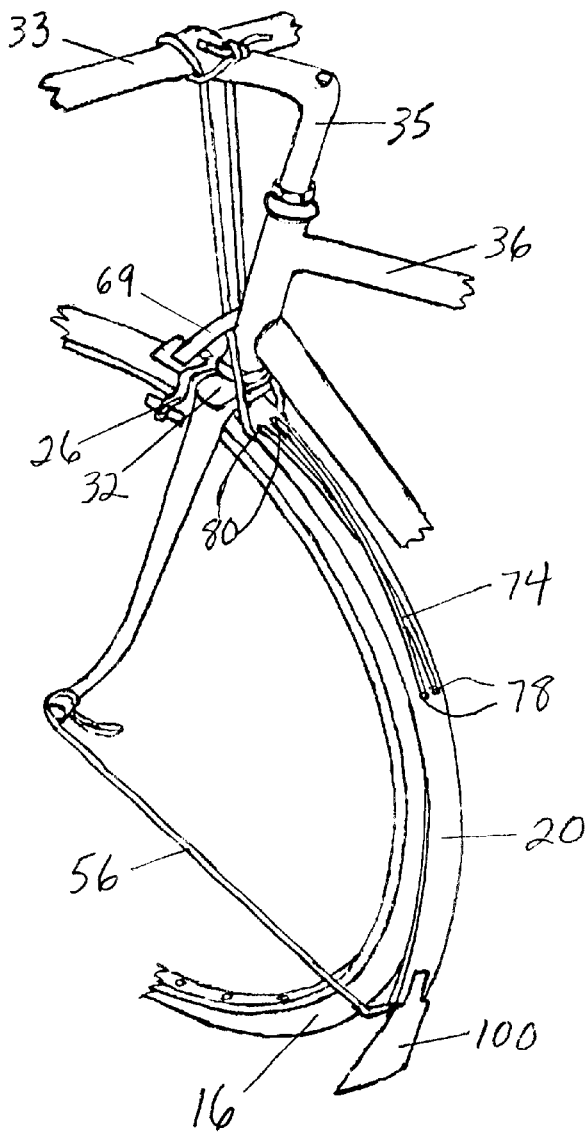
FIG. 8 is a perspective view of a front fender tensioning cord secured to the fender and handlebar stem.
Figure 9:
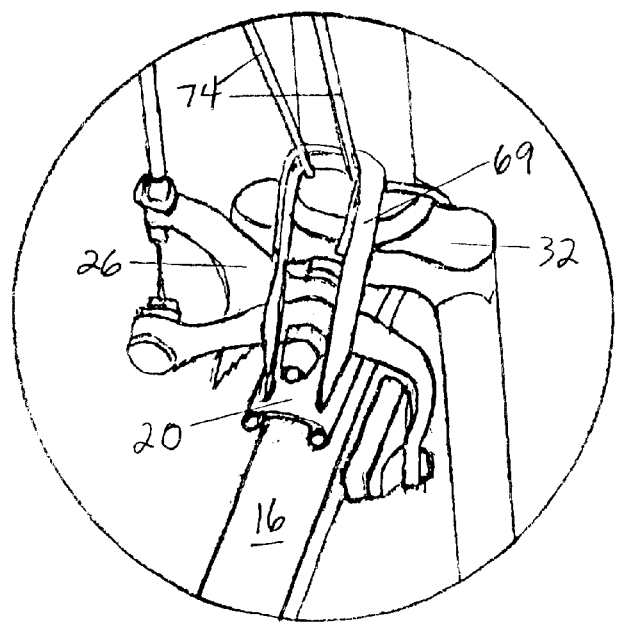
FIG. 9 is a perspective view of a an alternative hook and loop fastening strap for securing the front fender under the brake in combination with a front fender tensioning cord.

FIG. 8 shows the preferred cord tensioning means for the front fender. For the front fender, a cord 74 is first inserted through two holes 78 formed on opposite sides of the longitudinal centerline and in the lower half of the fender. The cord should be inserted so that each end of the cord extends through a respective hole in the direction away from the tire and so that the approximate middle of the cord is between the two holes on the underside of the fender. The ends of the cord are next inserted through another set of similar holes 80 formed in the fender behind the fork crown, preferably after the ends of the cord have been crossed over one another, as illustrated in FIG. 8. The cord should be passed through the upper holes in the direction toward the tire. The ends of the cord can then be pulled out in a sideways direction to tension the cord and then raised and wrapped around the neck of the handlebar stem 35 or the junction of the handlebar 33 and handlebar stem and tied together. This also permits the use of a single hook and loop fastener strap 69 that is secured around the cord 74 to hold the fender against the underside of the front brake, as shown in FIG. 9. This fastener strap can be positioned just in front of or behind the front brake, but the strap is somewhat easier to handle in the illustrated forward position. It is also possible to secure the cord in a number of other possible ways, such as by passing the ends of the cord over or around the shoulders of the fork crown and then tying the cord around the fork crown or at the handlebar stem.

The preferred rear fender tensioning means is also a cord that, similarly to the above-described method for the front fender, is secured through two sets of two holes formed in the fender. As shown in FIG. 5, the lower attachment location is through holes 82 at the rear of the fender roughly one-half to two-thirds of the distance from the rear brake to the rearward end of the fender. On the preferred four-piece rear sectional fender, the lower attachment location should be at the upper portion of the fourth (last) section. The other set of attachment holes 84 is located behind the rear brake and in front of the apex of the rear wheel. Once inserted through the behind-the-brake holes, the ends of the cord 86 can be pulled outwardly on each side of the fender to tension the cord, and then raised and wrapped around the seat tube/top tube/seat post junction and tied. Preferably, the cord is also passed through one or more cord keepers 88 located between the two sets of holes, which helps to prevent the cord from sliding off the sides of the fender. A cutting template for the rear brake/brake bridge fastening straps can also include the drilling locations and bit size for the upper tensioning cord holes.

In addition to reducing fender "bounce," the described front and rear tensioning cords also serve to maintain fender tire clearance under the fork crown and rear brake, thereby eliminating the need for securement straps at those locations. For the sectional fender, the described tensioning means also prevents any slippage of the fender sections. Both a standard non-stretchable nylon cord and an elastic shock cord, preferably in a diameter of approximately 1/8", have been shown to work as a fender tensioning cord. However, it can be appreciated that a tensioning means other than cords, such as single straps, will also work as a fender tensioning means.

While the present invention has been described with respect to specific embodiments, it is to be understood that other modifications and changes may be made to the disclosed embodiments without departing from the spirit and scope of the invention as defined by the following claims.

I claim:

1. A fender system for bicycles having a front wheel Mounted between fork dropouts and below a fork crown, a handlebar stem affixed to the fork, a rear wheel mounted between frame dropouts, a front brake a rear brake, a head tube frame member, a seat tube frame member, a top tube frame member joined to the seat tube, and a seat post inserted into the seat tube, said fender system comprising:

a. A front fender comprised of a polymeric material and having, longitudinally, a thin middle section and a tubular opening running along each side of said fender, and further having a length sufficient to cover the circumferential portion of the front tire extending rearwardly from a point in front of the front brake to a point below the horizontal midpoint of the front wheel;

b. A rear fender comprised of a polymeric material and having, longitudinally, a thin middle section and a tubular opening running along each side of said fender, and further having a length sufficient to cover the circumferential portion of the rear tire extending rearwardly from a point behind the bicycle bottom bracket to a point below the horizontal midpoint of the front wheel;

c. A single fender support stay comprised of metal wire or tubing and adapted to be removably secured to a fork dropout at one end of said support stay and, at the other end of said support stay, to removably engage a tubular opening at the rearward end of the front fender;

d. A single fender support stay comprised of metal wire or tubing and adapted to be removably secured to a frame dropout at one end of said support stay and, at the other end of said support stay, to removably engage a tubular opening at the rearward end of the rear fender;

e. A fastening means adapted to releasably fasten over the front brake, thereby securing said front fender against the underside of the front brake and fork crown;

f. A fastening means adapted to releasably fasten over the junction of the seat tube and top tube and in front of the bicycle seat post, thereby securing said rear fender against the underside of the rear brake;

g. A fastening means adapted to releasably secure the rear fender against the rearward surface of the bicycle seat tube at the point of least clearance between the seat tube and rear tire.

2. The fender system of claim 1 Wherein said fender support stays each have one end adapted to be inserted over a respective wheel axle or quick release skewer and clamped between the outer surface of a dropout and the inner surface of the adjacent fastening hardware used in securing the wheel within the dropouts.

3. The fender system of claim 1, herein said front and rear fender support stays each have one end adapted to be fastened to a threaded opening in a dropout by means of a suitably-sized screw fastener.

4. The fender system of claim 1, wherein said front and rear fender fastening means consists of hook and loop fastener straps.

5. The fender system of claim 1, further including an adjustable tensioning cord that attaches to the front fender at a first location below the lengthwise midpoint of the front fender and extends to a second fender attachment location behind the fork crown, and is releasably secured over the fork crown and around the bicycle head tube, or alternatively, around the handlebar stem.

6. The fender system of claim 1, further including an adjustable tensioning cord that attaches to the rear fender at a first location behind the apex of the rear wheel, extends to a second fender attachment location between the rear brake bridge and the apex of the rear wheel, and is releasably secured around the bicycle seat post.

7. The fender system of claim 1, wherein said front and rear fenders are comprised of multiple sections capable of being removably connected.

8. The fender system of claim 7, wherein the front fender consists of two sections of approximately equal length and the rear tender consists of four sections of approximately equal length.

9. The fender system of claim 1, further including a front and rear mudflap adapted to be slidably inserted, respectively, over said front and rear support stay and removably secured to said front and rear fender.

\* \* \* \* \*